(12) United States Patent
Haas et al.

(10) Patent No.: US 7,094,463 B2
(45) Date of Patent: Aug. 22, 2006

(54) FOAM AND METHOD OF MAKING

(75) Inventors: Christopher K. Haas, Cottage Grove, MN (US); Mark D. Gehlsen, Eagan, MN (US); Sara B. Mortenson, Somerville, MA (US); Joan M. Strobel, Maplewood, MN (US); Ravi K. Sura, Woodbury, MN (US); David L. Vall, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 10/334,412

(22) Filed: Dec. 30, 2002

(65) Prior Publication Data

US 2003/0105176 A1 Jun. 5, 2003

Related U.S. Application Data

(63) Continuation of application No. 10/275,639, filed as application No. PCT/US01/19989 on Jun. 21, 2001, now abandoned.

(51) Int. Cl.
*B32B 3/26* (2006.01)

(52) U.S. Cl. .................. 428/315.7; 428/315.5; 428/316.6; 428/319.3; 428/319.7; 428/317.1; 521/142; 521/143

(58) Field of Classification Search .......... 428/319.3, 428/319.7, 316.6, 317.1, 315.5, 315.7; 521/142, 521/143
See application file for complete search history.

(56) References Cited

U.S. PATENT DOCUMENTS

| | | | |
|---|---|---|---|
| 2,532,011 A | 11/1950 | Dahlquist et al. | |
| 2,607,711 A | 8/1952 | Hendricks | |
| 3,318,852 A | 5/1967 | Dixon et al. | |
| 3,502,497 A | 3/1970 | Crocker | |
| 3,549,470 A | 12/1970 | Greenwalt et al. | |
| 3,576,931 A | 4/1971 | Chopra et al. | |
| 3,627,703 A * | 12/1971 | Kojima et al. | 521/27 |
| 3,893,957 A | 7/1975 | Mixon et al. | |
| 4,241,198 A | 12/1980 | Kobayashi | |
| 4,264,672 A | 4/1981 | Taylor-Brown et al. | |
| 4,357,288 A * | 11/1982 | Oas et al. | 264/40.6 |
| 4,486,366 A | 12/1984 | Reddy | |
| 4,714,716 A | 12/1987 | Park | |
| 4,728,571 A | 3/1988 | Clemens et al. | |
| 4,916,198 A | 4/1990 | Scheve et al. | |
| 4,940,736 A | 7/1990 | Alteepping et al. | |
| 4,988,399 A * | 1/1991 | Watson et al. | 156/73.5 |
| 5,032,460 A | 7/1991 | Kantner et al. | |
| 5,160,674 A | 11/1992 | Colton et al. | |
| 5,202,190 A | 4/1993 | Kantner et al. | |
| 5,214,119 A | 5/1993 | Leihr et al. | |
| 5,290,615 A | 3/1994 | Tushaus et al. | |
| 5,356,706 A | 10/1994 | Shores | |
| 5,429,856 A | 7/1995 | Krueger et al. | |
| 5,599,602 A | 2/1997 | Leonard et al. | |
| 5,605,936 A | 2/1997 | DeNicola, Jr. et al. | |
| 5,629,076 A | 5/1997 | Fukasawa et al. | |
| 5,750,630 A | 5/1998 | Sengupta | |
| 5,929,129 A * | 7/1999 | Feichtinger | 521/134 |
| 6,521,675 B1 * | 2/2003 | Wu et al. | 521/143 |
| 6,593,005 B1 * | 7/2003 | Tau et al. | 428/516 |
| 6,646,019 B1 * | 11/2003 | Perez et al. | 521/142 |

FOREIGN PATENT DOCUMENTS

| | | |
|---|---|---|
| DE | 19840991 A1 | 3/2000 |
| EP | 0 570 221 A2 | 11/1993 |
| EP | 0 928 805 A2 | 7/1999 |
| EP | 928 805 A3 | 7/1999 |
| GB | 1157695 | 7/1969 |
| GB | 2061281 B | 5/1981 |
| WO | WO 98/08667 A2 | 3/1998 |
| WO | WO 98/08667 A3 | 3/1998 |
| WO | WO 00/00520 | 6/1998 |
| WO | WO 99/06623 | 2/1999 |
| WO | WO 9916797 A1 * | 4/1999 |
| WO | WO 99/32544 | 7/1999 |
| WO | WO 99/36466 | 7/1999 |
| WO | WO 99/47573 | 9/1999 |
| WO | WO 99/60053 | 11/1999 |
| WO | WO 99/61520 | 12/1999 |

OTHER PUBLICATIONS

Encyclopedia of Polymer Science and Technology, vol. 1, Interscience Publishers (New York, 1964).

(Continued)

*Primary Examiner*—Hai Vo

(57) ABSTRACT

The present invention is directed to a process for producing a polypropylene foam by mixing a high melt strength polypropylene and a blowing agent to form a melt mixture, reducing the temperature of the melt mixture at the exit of the apparatus to an exit temperature that is no more than 30° C. above the melt temperature of the neat polypropylene while maintaining the melt mixture at a pressure sufficient to prevent foaming; passing the mixture through said exit shaping orifice and exposing the mixture to atmospheric pressure, whereby the blowing agent expands causing cell formation resulting in foam formation, and orienting said foam. The foam is useful as tape backings, thermal and acoustical insulation and as a diffuse reflector for use in optical applications such as computer displays.

17 Claims, 6 Drawing Sheets

OTHER PUBLICATIONS

Encyclopedia of Polymer Science and Engineering, vol. 13, Wiley-Interscience Publishers (New York, 1988).

A New Technology To Manufacture Polypropylene Foam Sheet and Biaxially Oriented Foam Film, VTT Publications 361, Technical Research Center of Finland, (1998).

Westlaw document 59 C.C.P.A. 1220, 465 F.2d 904.

Stevens, M. J., "Principles of Energy Balance", *Extruder Principles and Operation*, (1985), pp. 181, 202-203, Elsevier Science Publishing Co., Inc., New York, NY.

Throne, J. L., *Thermoplastic Foam Extrusion*, (1937), p. 97, Hanser Gardner Publications, Inc., Cincinnati, OH.

\* cited by examiner

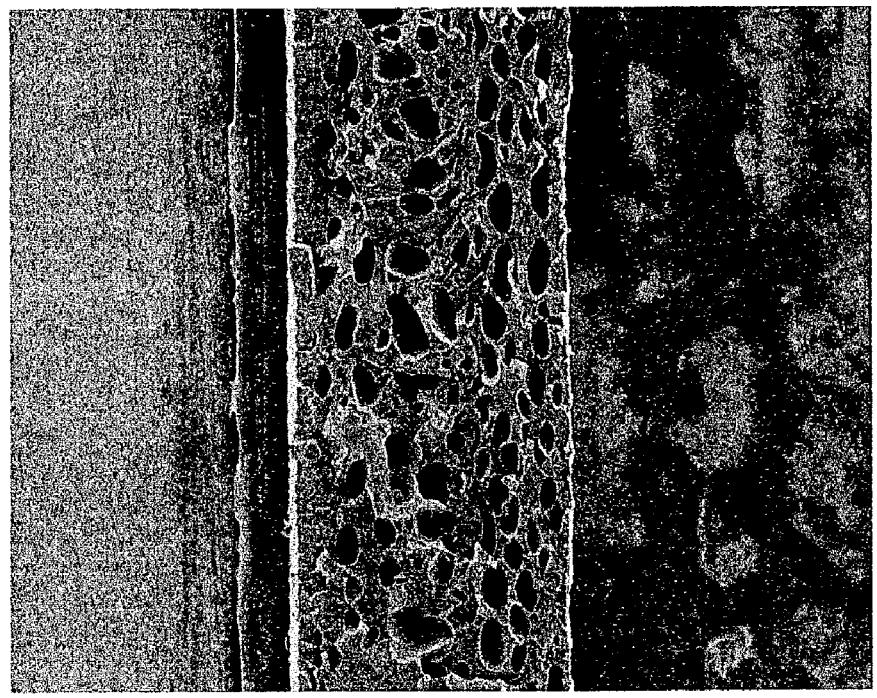
Fig. 3  100 μm
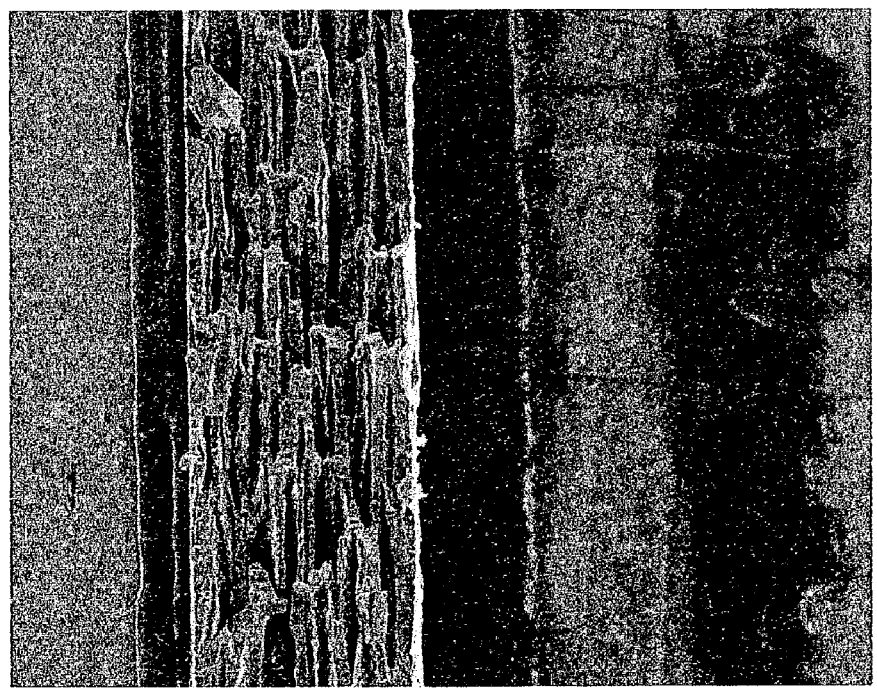
Fig. 4  100 μm

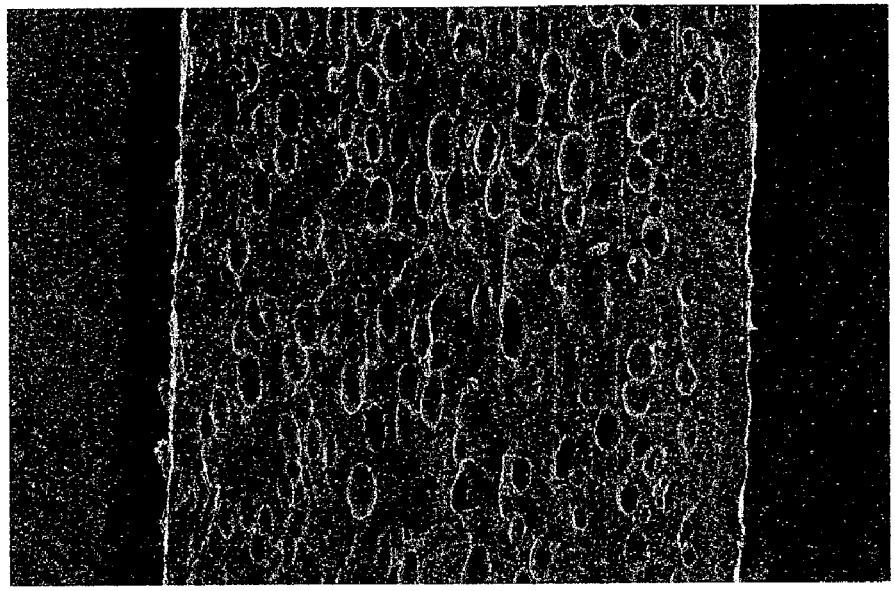
Fig. 7   100 μm
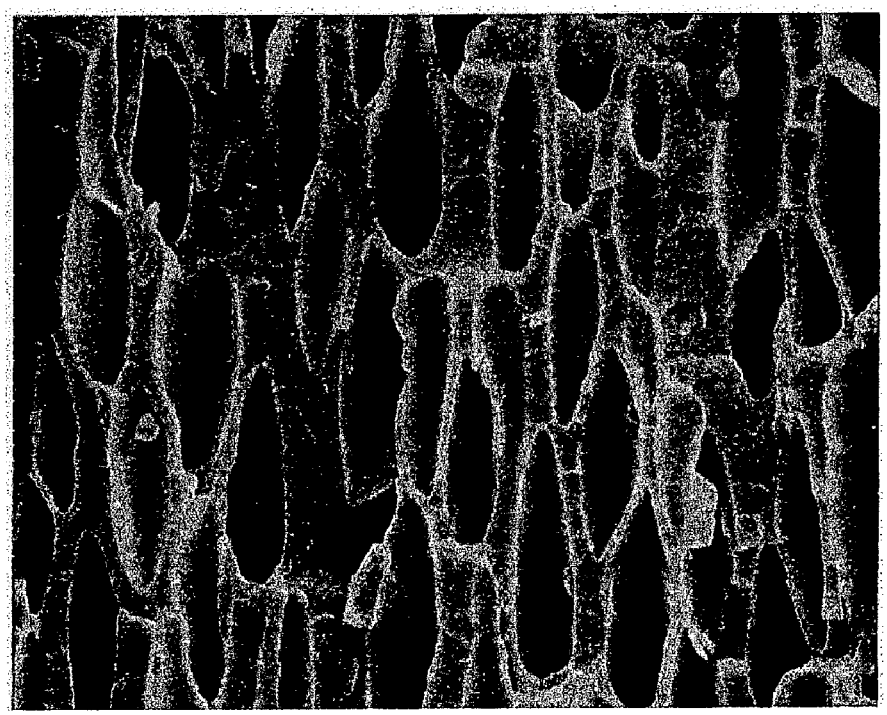
Fig. 8   100 μm

100 μm

10 μm

100 µm

10 µm

FOAM AND METHOD OF MAKING

CROSS REFERENCE TO RELATED APPLICATIONS

This is a continuation of application Ser. No. 10/275,639, filed Nov. 7, 2002; which was a national stage filing under 35 U.S.C. 371 of PCT/US01/19989 filed Jun. 21, 2001, which International Application was published by the International Bureau in English on Jan. 3, 2002, which claims priority to U.S. Ser. No. 09/602,032, filed Jun. 23, 2000.

The present invention is directed to a process for producing a polypropylene foam. The foam is useful as tape backings, thermal and acoustical insulation, low dielectric substrates and as a diffuse reflector for use in optical applications such as computer displays.

SUMMARY OF THE INVENTION

The present invention is directed to a process for preparing a foamed article, the process comprising the steps of:

(1) mixing at least one high melt strength polypropylene and at least one blowing agent in an apparatus having an exit shaping orifice at a temperature and pressure sufficient to form a melt mixture wherein the blowing agent is uniformly distributed throughout the polypropylene;

(2) reducing the temperature of the melt mixture at the exit of the apparatus to an exit temperature that is no more than 30° C. above the melt temperature of the neat polypropylene while maintaining the melt mixture at a pressure sufficient to prevent foaming;

(3) passing the mixture through said exit shaping orifice and exposing the mixture to atmospheric pressure, whereby the blowing agent expands causing cell formation resulting in foam formation, and (4) orienting said foam.

In another aspect, the present invention provides a process for preparing a foamed article, using a foamable mixture comprising a major amount of a high melt-strength polypropylene and a minor amount of second polymer component comprising a semicrystalline or amorphous thermoplastic polymer. Polymer mixtures comprising a high melt-strength polypropylene and two or more added polymers are also within the scope of the invention.

In another aspect, the present invention provides a process for preparing a multilayer foamed article, comprising at least one high-melt strength polypropylene foam As used in this invention:

Alpha-transition temperature, Tαc, means to the temperature at which crystallite subunits of a polymer are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure.

"Small-cell foam" means a foam having average cell dimensions of less than 100 micrometers (μm), preferably 5 to 50 μm (prior to orientation);

"closed-cell" means a foam that contains substantially no connected cell pathways that extend from one outer surface through the material to another outer surface;

"operating temperature" means the temperature that must be achieved in the extrusion process to melt all of the polymeric materials in the melt mix;

"exit temperature" and "exit pressure" mean the temperature and pressure of the extrudate in the final zone or zones of the extruder and preferably in the die;

"melt solution" or "melt mixture" or "melt mix" means a melt-blended mixture of polymeric material(s), any desired additives, and blowing agent(s) wherein the mixture is sufficiently fluid to be processed through an extruder;

"neat polymer" means a polymer that contains small amounts of typical heat-stabilizing additives, but contains no fillers, pigments or other colorants, blowing agents, slip agents, anti-blocking agents, lubricants, plasticizers, processing aids, antistatic agents, ultraviolet-light stabilizing agents, or other property modifiers;

"foam density" means the weight of a given volume of foam;

"density reduction" refers to a way of measuring the void volume of a foam based on the following formula:

$$\rho_R = \left[1 - \frac{\rho_f}{\rho_o}\right] \times 100\%$$

where $\rho_R$ is the density reduction, $\rho_f$ is the foam density, and $\rho_o$ is the density of the original material;

"polydispersity" means the weight average cell diameter divided by the number average cell diameter for a particular foam sample; it is a means of measuring the uniformity of cell sizes in the sample;

"uniform" means that the cell size distribution has a polydispersity of 1.0 to 2.0;

"spherical" means generally rounded; it may include spherical, oval, or circular structure;

"polymer matrix" means the polymeric, or "non-cell," areas of a foam;

"α-olefin" means an olefin having three or more carbon atoms and having a —CH=CH$_2$ group.

"total draw ratio" means the product of the draw ratios in the machine and transverse directions, i.e=MD×CD.

BRIEF DESCRIPTION OF THE FIGURES

FIG. 3 is a digital image of a scanning electron micrograph (SEM) of a front elevation of the foam of Comparative Example 1.

FIG. 4 is a digital image of a SEM of a side elevation of the foam of Comparative Example 1.

FIG. 7 is a digital image of a SEM of a side elevation of the foam of Example 5.

FIG. 8 is a digital image of a SEM of a side elevation of the foam of Example 6.

DETAILED DESCRIPTION

Figure 1:
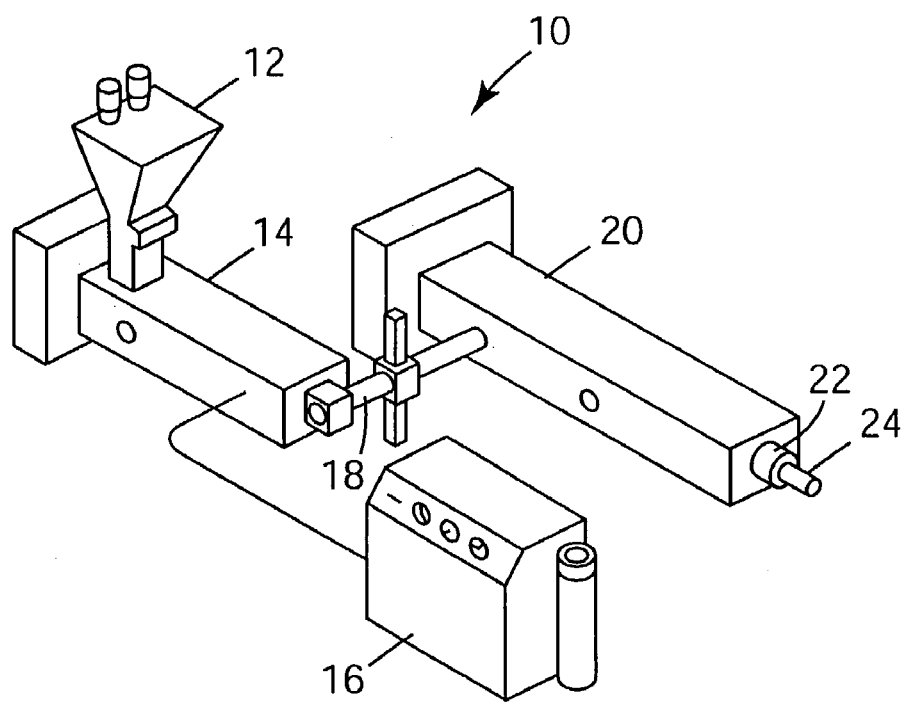
FIGS. 1 and 2 are schematics of processes for preparing the foams prepared according to the present invention.

The high melt strength polypropylene useful in the present invention includes homo- and copolymers containing 50 weight percent or more propylene monomer units, preferably at least 70 weight percent, and has a melt strength in the range of 25 to 60 cN at 190° C. Melt strength may be conveniently measured using an extensional rheometer by extruding the polymer through a 2.1 mm diameter capillary having a length of 41.9 mm at 190° C. and at a rate of 0.030 cc/sec; the strand is then stretched at a constant rate while measuring the force to stretch at a particular elongation. Preferably the melt strength of the polypropylene is in the range of 30 to 55 cN, as described in WO 99/61520.

The melt strength of linear or straight chain polymers, such as conventional isotactic polypropylene, decreases rapidly with temperature. In contrast, the melt strength of highly branched polypropylenes does not decrease rapidly with temperature. It is generally believed that the differences in melt strengths and extensional viscosity is attributable to the presence of long chain branching. Useful polypropylene resins are those that are branched or crosslinked. Such high melt strength polypropylenes may be prepared by methods generally known in the art. Reference may be made to U.S. Pat. No. 4,916,198 (Scheve et al) which describes a high melt strength polypropylene having a chain-hardening elongational viscosity prepared by irradiation of linear propylene in a controlled oxygen environment. Other useful methods include those in which compounds are added to the molten polypropylene to introduce branching and/or crosslinking such as those methods described in U.S. Pat. No. 4,714,716 (Park), WO 99/36466 (Moad, et al.) and WO 00/00520 (Borve et al.). High melt strength polypropylene may also be prepared by irradiation of the resin as described in U.S. Pat. No. 5,605,936 (Denicola et al.). Still other useful methods include forming a bipolar molecular weight distribution as described in J. I. Raukola, *A New Technology To Manufacture Polypropylene Foam Sheet And Biaxially Oriented Foam Film*, VTT Publications 361, Technical Research Center of Finland, 1998 and in U.S. Pat. No. 4,940,736 (Alteepping and Nebe).

The foamable polypropylene may be comprised solely of propylene homopolymer or may comprise a copolymer having 50 wt % or more propylene monomer content. Further, the foamable propylene may comprise a mixture or blend of propylene homopolymers or copolymers with a homo- or copolymer other than propylene homo- or copolymers.

Particularly useful propylene copolymers are those of propylene and one or more non-propylenic monomers. Propylene copolymers include random, block, and grafted copolymers of propylene and olefin monomers selected from the group consisting of ethylene, C3–C8 α-olefins and C4–C10 dienes. Propylene copolymers may also include terpolymers of propylene and α-olefins selected from the group consisting of C3–C8 α-olefins, wherein the α-olefin content of such terpolymers is preferably less than 45 wt %. The C3–C8 α-olefins include 1-butene, isobutylene, 1-pentene, 3-methyl-1-butene, 1-hexene, 3,4-dimethyl-1-butene, 1-heptene, 3-methyl-1-hexene, and the like. Examples of C4–C10 dienes include 1,3-butadiene, 1,4-pentadiene, isoprene, 1,5-hexadiene, 2,3-dimethyl hexadiene and the like.

Minor amounts (50 percent or less by weight) of other semicrystalline polymers that may be added to the high melt strength polypropylene in the foamable composition include high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/propylene/diene copolymer (EPDM).

Minor amounts (50 percent or less by weight) of amorphous polymers may be added to the high melt strength polypropylene. Suitable amorphous polymers include, e.g., polystyrenes, polycarbonates, polyacrylics, polymethacrylics, elastomers, such as styrenic block copolymers, e.g., styrene-isoprene-styrene (SIS), styrene-ethylene/butylene-styrene block copolymers (SEBS), polybutadiene, polyisoprene, polychloroprene, random and block copolymers of styrene and dienes (e.g., styrene-butadiene rubber (SBR)), ethylene-propylene-diene monomer rubber, natural rubber, ethylene propylene rubber, polyethylene-terephthalate (PETG). Other examples of amorphous polymers include, e.g., polystyrene-polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, polymethylmethacrylate (PMMA), fluorinated elastomers, polydimethyl siloxane, polyetherimides, amorphous fluoropolymers, amorphous polyolefins, polyphenylene oxide, polyphenylene oxide-polystyrene alloys, copolymers containing at least one amorphous component, and mixtures thereof.

An extrusion process using a single-screw, double-screw or tandem extrusion system may prepare the foams of the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a physical blowing agent, such as $CO_2$ is used, the neat polymer is initially maintained above the melting temperature. The physical blowing agent is injected (or otherwise mixed) with the molten polymer and the melt mixture is cooled in the extruder to an exit temperature that is less than 30° C. above the melting temperature of the neat polymer ($T \leq T_m + 30°$ C.) while the pressure is maintained at or above 2000 psi (13.8 MPa). Under these conditions the polymer/blowing agent remains a single phase. As the melt mixture passes through the exit/shaping die the melt rapidly foams and expands, generating foams with small, uniform cell sizes. It has been found that by adding a physical blowing agent, the polypropylene may be processed and foamed at temperatures considerably lower than otherwise might be required. The blowing agent may plasticize, i.e., lower the $T_m$ of, the polymeric material. The lower temperature can allow the foam to cool and stabilize soon after it exits the die, thereby making it easier to arrest cell growth and coalescence while the cells are smaller and more uniform.

When a chemical blowing agent is used, the blowing agent is added to the neat polymer, mixed, heated to a temperature above the $T_m$ of the polypropylene to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single phase mixture is cooled to a temperature no more than 30° C. above the melting temperature of the neat polymer, while the pressure is maintained at or above 2000 psi (13.8 MPa), by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the melt mixture exit temperature is at or below 30° C. above the Tm of the neat polypropylene, the increase in $T_m$ of the polymer as the blowing agent comes out of the solution causes crystallization of the polypropylene, which in turn arrests the growth and coalescense of the foam cells within seconds or, most typically, a fraction of a second. This preferably results in the formation of small and uniform voids in the polymeric material. When the exit temperature is no more than 30° C. above the $T_m$ of the neat polypropylene, the extensional viscosity of the polymer increases as the blowing agent comes out of the solution and the polypropylene rapidly crystallizes. These factors arrest the growth and coalescense of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Either a physical or chemical blowing agent may plasticize, i.e., lower the $T_m$ and $T_g$ of, the polymeric material. With the addition of a blowing agent, the melt mixture may be processed and foamed at temperatures considerably lower than otherwise might be required, and in some cases may be processed below the melt temperature of the polypropylene. The lower temperature can allow the foam to cool and stabilize (i.e., reach a point of sufficient solidification to arrest further cell growth and produce smaller and more uniform cell sizes.

Physical blowing agents useful in the present invention may be any materials that are a vapor at the temperature and pressure at which the foam exits the die. The physical blowing agent may be introduced, i.e., injected into the polymeric material as a gas, a supercritical fluid, or liquid, preferably as a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Flammable blowing agents such as pentane, butane and other organic materials may be used, but non-flammable, non-toxic, non-ozone depleting blowing agents such as carbon dioxide, nitrogen, water, $SF_6$, nitrous oxide, argon, helium, noble gases, such as xenon, air (nitrogen and oxygen blend), and blends of these materials are preferred because they are easier to use, e.g., fewer environmental and safety concerns. Other suitable physical blowing agents include, e.g., hydrofluorocarbons (HFC), hydrochlorofluorocarbons (HCFC), and fully- or partially fluorinated ethers.

Chemical blowing agents are added to the polymer at a temperature below that of the decomposition temperature of the blowing agent, and are typically added to the polymer feed at room temperature prior to introduction to the extruder. The blowing agent is then mixed to distribute it throughout the polymer in undecomposed form, above the melt temperature of the polypropylene, but below the activation temperature of the chemical blowing agent. Once dispersed, the chemical blowing agent may be activated by heating the mixture to a temperature above its decomposition temperature of the agent. Decomposition of the blowing agent liberates gas, such as $N_2$, $CO_2$ and/or $H_2O$, yet cell formation is restrained by the temperature and pressure of the system. Useful chemical blowing agents typically decompose at a temperature of 140° C. or above.

Examples of such materials include synthetic azo-, carbonate-, and hydrazide-based molecules, including azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide and trihydrazino triazine. Specific examples of these materials are Celogen OT (4,4' oxybis (benzenesulfonylhydrazide), Hydrocerol BIF (preparations of carbonate compounds and polycarbonic acids), Celogen AZ (azodicarbonamide) and Celogen RA (p-toluenesulfonyl semicarbazide).

The amount of blowing agent incorporated into the foamable polymer mixture is chosen to yield a foam having a void content in excess of 10%, more preferably in excess of 20%, as measured by density reduction; [1−the ratio of the density of the foam to that of the neat polymer]×100. Generally, greater foam void content reduces the foam density, weight and material costs for subsequent end uses.

FIG. 1 illustrates a tandem extrusion apparatus 10 that may be used to make the foams of the present invention, and is a preferred process for use with a physical blowing agent. To form a melt mixture, polymeric material is initially fed from hopper 12 into a first extruder 14 that melts and conveys the polymeric material. The polymeric material may be added to extruder 14 in any convenient form. Additives are typically added with the polymer material but may be added further downstream. The blowing agent, typically in a liquid or supercritical form, is injected near the exit of the first extruder. Due to the conditions in the extruder, the blowing agent is typically in a supercritical state while in the extruder.

The polymers, additives, and blowing agent are melt-mixed in first extruder 14. The physical blowing agent is typically introduced by injection at some intermediate stage of extruder 14 by means of fluid handling equipment 16. The purpose of the melt-mixing step is to prepare a foamable, extrudable composition in which the blowing agent and other additives, to the extent present, are distributed homogeneously throughout the molten polymeric material. Specific operating conditions are selected to achieve such homogeneous distribution based upon the properties and characteristics of the particular composition being processed. The operating and exit pressures in extruder 14 should be sufficient to prevent the blowing agent from expanding in the extruder. The operating temperature in the extruder 14 should be sufficient to melt and/or soften all of the polymers in the melt mixture.

Next, the melt mix is fed to a second extruder 20 (typically a single screw extruder) by means of conduit 18. Extruder 20 is generally operated at conditions (e.g., screw speed, screw length, pressure, and temperature) selected to achieve optimum mixing, and to keep the blowing agent in solution. Extruder 20 typically has a decreasing temperature profile wherein the temperature of the last zone or zones will bring the melt solution to the desired exit temperature.

At the exit end of extruder 20, the foamable, extrudable composition is metered into die 22 which has a shaping/exit orifice (e.g., an annular, rod, slit die, or shaped profile die). The temperature within die 22 is preferably maintained at substantially the same temperature as the last zone of extruder 20; i.e., at the exit temperature. The relatively high pressure within extruder 20 and die 22 prevents cell formation and foaming of the melt mix composition in the extruder and die. Exit pressure is dependent upon die orifice size, exit temperature, blowing agent concentration, polymer flowrate, polymer viscosity, screw speed and polymer type. Exit pressure is typically controlled by adjusting the die orifice size, but can also be adjusted by altering the exit temperature, blowing agent concentration, and other variables. Reducing the size of the die orifice will generally increase exit pressure. As the composition exits die 22 through the die's shaping orifice, it is exposed to ambient pressure. The pressure drop causes the blowing agent to expand, leading to cell formation. Foam 24 is typically quenched, i.e., brought to a temperature below the $T_m$ of the polypropylene, within two to five centimeters of the die exit, more typically and preferably less than two centimeters, as the foamable material exits the die and is exposed to ambient pressure.

The shape of the die exit orifice dictates the shape of foam 24. A variety of shapes may be produced, including a continuous sheet, including sheets with patterned profiles, a tube, a rope, etc.

In general, as the blowing agent separates from the melt mixture, its plasticizing effect on the polymeric material decreases and the extensional viscosity of the polymeric material increases. The viscosity increase is much sharper at the $T_m$ than at the $T_g$, making the choice of foaming temperatures for semicrystalline polymers much more stringent than for amorphous polymers. As the temperature of the polymeric material approaches the $T_m$ of the neat polymer and becomes more viscous, the cells cannot as easily expand or coalesce. As the foam material cools further, it solidifies in the general shape of the exit shaping orifice of die 22.

Figure 2:
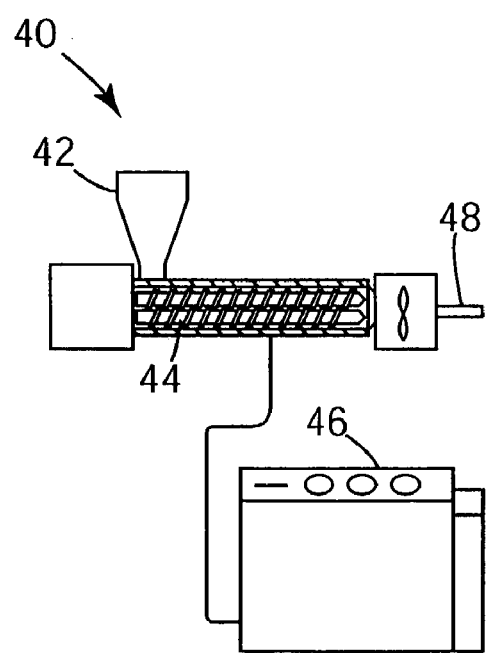

FIG. 2 illustrates a single stage extrusion apparatus 40 that can be used to make the foams of the present invention, and is the preferred process for use with chemical blowing agents. A twin screw extruder 44 (as depicted) may be used to form a melt mixture of the polypropylene and blowing agent, although it will be understood that a single screw extruder may also be used. The polypropylene is introduced into zone 1 of extruder 44 by means of hopper 42. Chemical blowing agents are typically added with the polymer but may be added further downstream. A physical blowing agent may be added using fluid handling means 46 at a location downstream from a point at which the polymer has melted.

When a physical blowing agent is used, the extruder 44 may be operated with a generally decreasing temperature profile. If a chemical blowing agent is used, an intermediate zone is generally maintained at an elevated temperature sufficient to initiate the chemical blowing agent, followed by subsequent cooler zones. The temperature of the initial zone(s) of the extruder must be sufficient to melt the polypropylene and provide a homogenous melt mixture with the blowing agent. The final zone or zones of the extruder are set to achieve the desired extrudate exit temperature.

Using a single stage extrusion process, as compared to using a tandem process, to produce a homogeneous foamable mixture requires mixing and transitioning from an operating temperature and pressure to an exit temperature and pressure over a shorter distance. To achieve a suitable melt mix, approximately the first half of the extruder screw may have mixing and conveying elements which knead the polymer and move it through the extruder. The second half of the screw may have distributive mixing elements to mix the polymer material and blowing agent into a homogeneous mixture while cooling.

As with the tandem process, the operating and exit pressures (and temperatures) should be sufficient to prevent the blowing agent from causing cell formation in the extruder. The operating temperature is preferably sufficient to melt the polymer materials, while the last zone or zones of the extruder are preferably at a temperature that will bring the extrudate to the exit temperature.

At the exit end of the extruder, the foamable, extrudable composition is metered into a die 48 having a shaping exit orifice. The foam is generated in the same manner as with the tandem system.

The blowing agent concentrations, exit pressure, and exit temperature can have a significant effect on the properties of the resulting foams including foam density, cell size, and distribution of cell sizes. In general, the lower the exit temperature, the more uniform, and smaller, the cell sizes of the foamed material. This is because at lower exit temperatures, the extensional viscosity is higher, yielding slower cell growth. Extruding the material at lower than normal extrusion temperatures, i.e. no more than 30° C. above the $T_m$ of the neat polymeric material, produces foams with small, uniform cell sizes.

In general, as the melt mixture exits the die, it is preferable to have a large pressure drop over a short distance. Keeping the solution at a relatively high pressure until it exits the die helps to form uniform cell sizes. Maintaining a large pressure drop between the exit pressure and ambient pressure can also contribute to the quick foaming of a melt mixture. The lower limit for forming a foam with uniform cells will depend on the critical pressure of the blowing agent being used. In general, for the high melt strength polypropylene useful in the invention, the lower exit pressure limit for forming acceptably uniform cells is approximately 7 MPa (1000 psi), preferably 10 MPa (1500 psi), more preferably 14 MPa (2000 psi). The smallest cell sizes may be produced at low exit temperatures and high blowing agent concentrations. However at any given temperature and pressure, there is a blowing agent concentration at and above which polydispersity will increase because the polymer becomes supersaturated with blowing agent and a two phase system is formed.

The optimum exit temperature, exit pressure, and blowing agent concentration for a particular melt mixture will depend on a number of factors such as the type and amount of polymer(s) used; the physical properties of the polymers, including viscosity; the mutual solubility of the polymer(s) and the blowing agent; the type and amount of additives used; the thickness of the foam to be produced; the desired density and cell size; whether the foam will be coextruded with another foam or an unfoamed material; and the die gap and die orifice design.

The present invention provides foams having average cell sizes less than 100 micrometers, and advantageously may provide foams having average cell sizes less than 50 micrometers. Additionally the foams produced have a closed cell content of 70 percent or greater. As result of extrusion, the cells may be elongated in the machine direction.

In order to optimize the physical properties of the foam, the polymer chains need to be oriented along at least one major axis (uniaxial), and may further be oriented along two major axes (biaxial). The degree of molecular orientation is generally defined by the draw ratio, that is, the ratio of the final length to the original length.

Upon orientation, greater crystallinity is imparted to the polypropylene component of the foam and the dimensions of the foam cells change. Typical cells have major directions X and Y, proportional to the degree of orientation in the machine and transverse direction respectively. A minor direction Z, normal to the plane of the foam, remains substantially the same as (or may be moderately less than) the cross-sectional dimension of the cell prior to orientation.

The conditions for orientation are chosen such that the integrity of the foam is maintained. Thus when stretching in the machine and/or transverse directions, the orientation temperature is chosen such that substantial tearing or fragmentation of the continuous phase is avoided and foam integrity is maintained. The foam is particularly vulnerable to tearing, cell rupture or even catastrophic failure if the orientation temperature is too low or the orientation ratio(s) is/are excessively high. Generally the foam is oriented at a temperature between the glass transition temperature and the melting temperature of the neat polypropylene. Preferably, the orientation temperature is above the alpha transition temperature of the neat polymer. Such temperature conditions permit optimum orientation in the X and Y directions without loss of foam integrity.

Unexpectedly, it has been found that orienting the foam reduces the density of the foam, thus enabling the production of lower density foams than are achievable using blowing agents alone. Up to a 60% reduction in density has been observed. There is a practical limit to the amount of blowing agent that can be used to prepare foams, particularly chemical blowing agents that leave an organic residue in the polymer matrix on decomposition. The instant invention provides the additional benefits to the foamed article such as lower manufacturing and materials costs, better insulation properties, greater surface area, ease of manufacturing, enhanced diffuse reflectivity, reduced dielectric constant, controlled tearability and increased tensile strength on a weight basis.

After orientation the cells are relatively planar in shape and have distinct boundaries. Cells are generally coplanar with the major surfaces of the foam, with major axes in the machine (X) and transverse (Y) directions (directions of orientation). The sizes of the cells are uniform and proportional to concentration of blowing agent, extrusion conditions and degree of orientation. The percentage of closed cells does not change significantly after orientation when using high melt strength polypropylene. In contrast, orientation of conventional polypropylene foam results in cell collapse and tearing of the foam, reducing the percentage of closed cells. Cell size, distribution and amount in the foam matrix may be determined by techniques such as scanning electron microscopy.

In the orienting step, the foam is stretched in the machine direction and may be simultaneously or sequentially stretched in the transverse direction. When first stretched in the machine direction, the individual fibrils of the spherulites of the polypropylene are drawn substantially parallel to the machine direction (direction of orientation) of the film and in the plane of the film. The oriented fibrils can be visualized as having a rope-like appearance. Subsequent or further orientation of the film in the transverse direction results in reorientation of the fibrils, again in the plane of the film, with varying populations along the X,Y and intermediate axes, depending on the degree of orientation in the machine and transverse directions.

The stretching conditions are chosen to increase the crystallinity of the polymer matrix and the void volume of the foam. It has been found that an oriented foam has significantly enhanced tensile strength, even with a relatively low void content when compared to unoriented foams.

The foam may be biaxially oriented by stretching in mutually perpendicular directions at a temperature above the alpha transition temperature and below the melting temperature of the polypropylene. Generally, the film is stretched in one direction first and then in a second direction perpendicular to the first. However, stretching may be effected in both directions simultaneously if desired. If biaxial orientation is desired, it is preferable to simultaneously orient the foam, rather than sequentially orient the foam along the two major axes. It has been found that simultaneous biaxial orientation provides greater density reduction as well as improved physical properties such as tensile strength as compared to sequential biaxial orientation. Simultaneous biaxial orientation also provides more isotropic tensile tear properties. Advantageously, simultaneous orientation provides an oriented high melt strength polypropylene foam wherein the tensile strength of the foam in the cross direction is within 30% of the tensile strength in the machine direction. Multilayer articles comprising the simultaneous biaxially oriented foam are also within the scope of the invention.

In a typical sequential orientation process, the film is stretched first in the direction of extrusion over a set of rotating rollers is then stretched in the direction transverse thereto by means of a tenter apparatus. Alternatively, foams may be stretched in both the machine and transverse directions in a tenter apparatus. Foams may be stretched in one or both directions 3 to 50 times total draw ratio (MD×CD). Generally greater orientation is achievable using foams of small cell size; foams having cell size of greater than 100 micrometers are not readily oriented more than 20 times, while foams having a cell size of 50 micrometers or less could be stretched up to 50 times total draw ratio. In addition foams with small average cell size exhibit greater tensile strength and elongation to break after stretching.

The temperature of the polymer foam during the first orientation (or stretching) step affects foam properties. Generally, the first orientation step is in the machine direction. Orientation temperature may be controlled by the temperature of heated rolls or by the addition of radiant energy, e.g., by infrared lamps, as is known in the art. A combination of temperature control methods may be utilized. Too low an orientation temperature may result in tearing the foam and rupturing of the cells. Orientation is generally conducted at temperatures between the glass transition temperature and the melting temperature of the neat polypropylene, or at about 110–170° C., preferably 110–140° C. A second orientation, in a direction perpendicular to the first orientation may be desired. The temperature of such second orientation is generally similar to or higher than the temperature of the first orientation.

After the foam has been stretched it may be further processed. For example, the foam may be annealed or heat-set by subjecting the foam to a temperature sufficient to further crystallize the polypropylene while restraining the foam against retraction in both directions of stretching.

The final thickness of the foam will be determined in part by the extrusion thickness, the degree of orientation, and any additional processing. The present invention provides thinner foams than are generally achievable by prior art processes. Most foams are limited in thickness by the cell size. In the present invention, the small cell sizes (<50 micrometers) in combination with the orientation allows the thickness of 2 to 100 mils (0.05 to 0.25 mm) or less, and foams of 10 to 80 mils (0.025 to 0.2 mm) are readily prepared.

The present invention may be used to produce multilayer articles comprising at least one high melt strength foam layer. The foams of the present invention may be coextruded with materials having substantially higher or lower processing temperatures from that of the foam, while still obtaining the desired structures and cell sizes. It would be expected that exposing the foam to an adjacent hot polymer as it is extruded, might cause the foam cells, especially those in direct contact with the hotter material, to continue to grow and coalesce beyond their desired sizes or might cause the foam material to melt or collapse.

The coextrusion process of the present invention may be used to make a foam material comprising two layers or more. A layered material or article may be produced by equipping die 22 or 50 with an appropriate feed block, e.g., a multilayer feedblock, or by using a multi-vaned or multi-manifold die such as a 3-layer vane die available from Cloeren, Orange, Tex. Materials or articles having multiple adjacent foam layers may be made with foam layers comprising the same or different materials. Foam articles of the present invention may comprise one or more interior and/or exterior foam layer(s). In such a case, each extrudable material, including the high melt strength polypropylene foamable material, may be processed using one of the above-described extrusion methods wherein melt mixtures are fed to different inlets on a multi-layer feedblock, or multi-manifold die, and are brought together prior to exiting the die. The layers foam in generally the same manner as described above for the extrusion process. The multi-layer process can also be used to extrude the foam of this invention with other types of materials such as thermoplastic films and adhesives. When a multi-layered article is produced, it is preferable to form adjacent layers using materials having similar viscosities and which provide interlayer adhesion. When the multilayer article comprises a foam layer and a film layer (on one or both surfaces), greater degrees of orientation, improved tensile properties, and smaller cell size are possible than with single layer foam.

If adjacent layers of materials are heated to substantially different temperatures, a die can be used that thermally isolates the different materials until just prior to their exiting the die, for example the die disclosed in FIG. 4 of U.S. Pat. No. 5,599,602. This can diminish or eliminate negative effects of contacting the different materials such as melting or collapsing the foam or causing continued cell expansion coalescense.

Multilayer foam articles can also be prepared by laminating polymer or nonpolymer layers to a foam core, or by layering extruded foams as they exit their respective shaping orifices, with the use of some affixing means such as an adhesive. Useful laminated constructions include the high melt strength polypropylene foam layer with a thermoplastic film layer or a scrim layer, such as a non-woven layer. Other techniques that can be used include extrusion coating and inclusion coextrusion, which is described in U.S. Pat. No. 5,429,856. The multilayer article may be oriented as previously described.

Oriented foams are especially useful as tape backings or straps to yield an extremely strong tape due to the high modulus and tensile strength of the polymer matrix. When used as a tape backing, the film can be coated with any conventional hot melt, solvent coated, or like adhesive suitable for application to films. Either or both surfaces may be coated. Advantageously, when using a biaxially oriented foam of the present invention, the adhesive tapes prepared therefrom may be easily torn in either the longitudinal or transverse direction.

Many types of adhesives can be used. The adhesive can include hot melt-coated formulations, transfer-coated formulations, solvent-coated formulations, water-based, and latex formulations, as well as laminating, thermally-activated, and water-activated adhesives. These adhesives can be applied by conventional techniques, such as solvent coating by methods such as reverse roll, knife-over-roll, gravure, wire wound rod, floating knife or air knife, hot-melt coating such as; by slot orifice coaters, roll coaters or extrusion coaters, at appropriate coating weights.

Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

Useful adhesives according to the present invention can be pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

When a pressure sensitive adhesive is coated onto one side of the backing and a release coating (a low adhesion backsize (LAB) coating) is optionally coated on the opposite side to allow the resultant tape to unwind from itself when wound in a roll or release when in a pad form.

When utilized, the release coating composition should be compatible with the adhesive composition and not degrade the adhesive properties of the tape, such as by being transferred to the adhesive composition.

Release coating compositions for the LAB layer of tapes may include silicone, alkyl, or fluorochemical constituents, or combinations as the release imparting component. Useful release coating compositions for the invention include silicone containing polymers, such as silicone polyurethanes, silicone polyureas and silicone polyurethane/ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202, 190, and 4,728,571. Other useful release coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate)

such as those described in U.S. Pat. Nos. 3,502,497 and 4,241,198, where the alkyl side chain includes from about 16 to 22 carbon atoms.

These release polymers can be blended with each other and with thermosetting resins or thermoplastic film forming polymers to form the release coating composition. In addition, other additives may be used in the release coating compositions such as fillers, pigments, wetting agents, viscosity modifiers, stabilizers, anti-oxidants, and cross-linking agents.

Numerous other layers can be added to the tape, such as primers to increase adhesive layer adhesion to the backing layer. Also, the release properties of the backing can be modified such that the backing and the adhesive cooperate to achieve desired unwind characteristics. The release properties of the backing can be modified by applying a low surface energy composition, priming, corona discharge, flame treatment, roughening, etching, and combinations.

EXAMPLES

Test Methods

Foam Density (ASTM D792-86)

Foam samples were cut into 12.5 mm×12.5 mm specimens and weighed on a high precision balance available as Model AG245 from Mettler-Toledo, Greifensee, Switzerland. The volume of each sample was obtained by measuring the mass of water displaced at room temperature (25±1° C.). Assuming the density of water at 25° C. to be 1 $g/cm^3$, the volume of each sample was calculated using Archimedes principle. The density of the foam was obtained by the quotient of the mass and volume. Accuracy of this measurement is ±0.01 $g/cm^3$.

Foam Cell Size

Scanning electron microscopy was performed on all the foam samples using a scanning electron microscope available as model JSM-35C from JEOL USA, Inc., Peabody, Mass., operated at 5 and 10 kV. The samples were prepared by freezing in liquid nitrogen for 2–5 minutes and fracturing. A thin palladium-gold coating was evaporated on the samples to develop a conductive surface. The diameters of the foam cells were measured using the digital SEM micrographs and UTHSCSA Image Tool for Windows Software (Version 1.28, University of Texas, San Antonio, Tex.). The diameters of over 100 cells were measured and recorded. The average cell dimension was calculated using the Image Tool Software.

Mechanical Properties

Mechanical properties of the foams were measured in tensile mode at approximately 23° C. using an Instron Testing Device (Instron Corp., Canton, Mass.). The samples were first conditioned at 23° C. and 50% humidity for two days. The samples were then made using a dogbone die with a testing region dimensions of 2.54 cm×0.32 cm and the thickness of the specimens was measured and recorded. 3M fiber tape was used around the non-testing region of the dogbone to provide better grip in the clip. The samples were tested at tensile rates of 25.4 cm/min until failure and the stress was measured as a function of elongation. Average values are reported.

Example 1

A melt mixture of high melt strength polypropylene (PF814™, Montell North America, Inc., Wilmington, Del.; melt flow of approximately 2 to 4 dg/min.) and 2% by weight of a chemical blowing agent (RIC-50™, citric acid/sodium bicarbonate mixture from Reedy International Corp., Keyport, N.J.) was prepared in a 1.25" (3.2 cm) single screw extruder (Killion Extruders Div. of Davis-Standard Corp., Cedar Grove, N.J.) equipped with a Saxton single stage screw at 40 rpm and a temperature profile from 160 to 221 to 182° C. The exit temperature was 180° C., creating an exit pressure of 13.8 MPa. The melt mixture was extruded through a 15.2 cm foam die (Extrusion Dies Inc., Canfield, Ohio) and the resulting foam sheet was cooled on a chrome cast roll at 150° F. (65.5° C.), then collected at a draw rate of 1.5 m/min. The foam was white and opaque, and had a density of 0.56 g/cc at a thickness of 0.6 mm. As shown in FIGS. 3 and 4, cells of the foam were slightly elongated in the machine direction (MD) and range in average dimension between 50 and 200 μm, generally greater than 100 μm. Simultaneous biaxial orientation of the foam (3.5× by 3.5×) in a laboratory-scale batch orienter at approximately 135–140° C. provided a silvery, diffusely reflective material with a density of 0.37 g/cc.

Example 2 (Comparative)

A foam sample was prepared from a lower melt strength isotactic polypropylene having a melt flow of approximately 2 to 4 dg/min (PP3374™, Fina Inc., Dallas, Tex.). The polymer was mixed in a 25 mm diameter twin screw extruder (Berstorff Corp., Florence, Ky.) at 80 rpm with 2% by weight of azodicarbonamide blowing agent (FM1307H™, available from Ampacet Co., Cincinnati, Ohio). Temperature and pressure profiles and casting conditions were essentially identical to those described in Example 1. The resultant yellowish opaque foam had a thickness of 0.7 mm and a density of 0.66 g/cc. Simultaneous biaxial orientation of the foam (4× by 4×) in a laboratory-scale batch orienter at approximately 135–140° C. provided a much less opaque material with a density of 0.62 g/cc. Significant cell collapse was observed after orientation. When oriented at 2.5× by 2.5×, the foam density was 0.54 g/cc.

Example 3 (Comparative)

Figure 5:
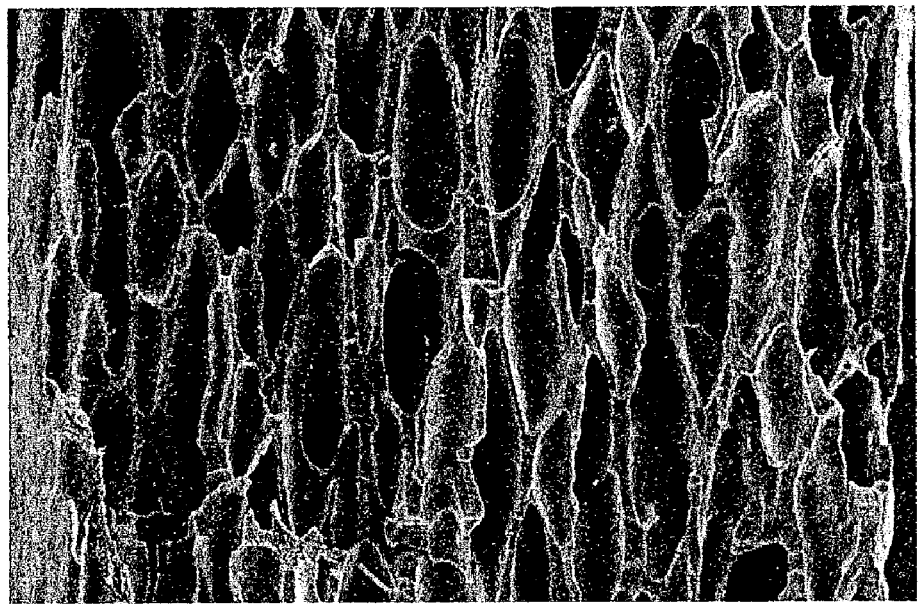
FIG. 5 is a digital image of a SEM of a side elevation of the foam of Comparative Example 3.

A melt mixture of high melt strength polypropylene (PF814™) and 3% by weight of FM1307H™ chemical blowing agent was prepared in a 2.5 inch (6.3 cm) single screw extruder (Davis-Standard) equipped with a Saxton single stage screw at 45 rpm and a temperature profile from 127 to 216 to 204° C. The exit temperature was 188° C., creating an exit pressure of 9.0 MPa. The melt mixture was extruded through a 25.4 cm foam die (Extrusion Dies Inc., Canfield, Ohio) and the resulting foam sheet was cooled on a chrome cast roll at 18° C., then collected at a draw rate of 9 m/min. The foam had a density of 0.37 g/cc at a thickness of 0.9 mm. As shown in FIG. 5, cells of the foam were noticeably elongated in the machine direction, approximately 100–150 μm, and large in general, measuring 60–80 μm in CD. Attempts at orienting this low-density, large cell foam were unsuccessful.

Example 4 (Comparative)

Figure 6:
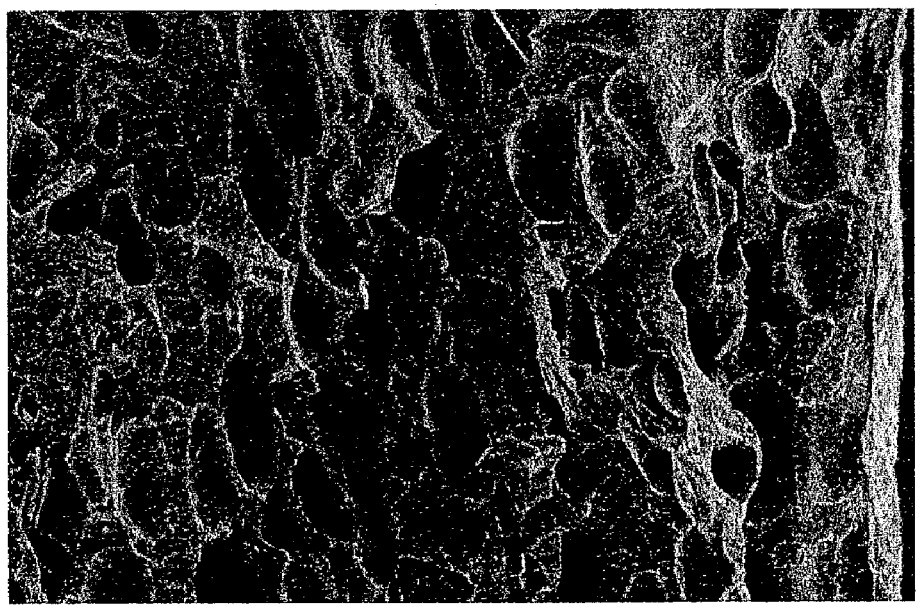
FIG. 6 is a digital image of a SEM of a side elevation of the foam of Comparative Example 4.

The procedure of Example 3 was repeated using only 1% by weight chemical blowing agent, in an attempt to increase foam density. The foam was drawn at 4.5 m/min. The resulting foam had a density of 0.60 g/cc and a thickness of 1.13 mm. As shown in FIG. 6, cells of the foam were non-uniform in size and shape, were not evenly distributed, and measured approximately 60–100 μm in size.

Example 5

A foam was prepared as described in Example 3, except that the exit temperature was lowered to 141° C., creating an exit pressure of 12.4 MPa. The foam was drawn at 3.1 m/min. The unoriented foam, shown in FIG. 7, had a density of 0.68 g/cc and a thickness of 1.1 mm, with cells of uniform size, approximately 30–50 μm. The foam was oriented at 130° C. by 3.5× stretching in the machine direction using a multi-roll length orienter (LO) followed by 3× stretching in the transverse direction in a tenter oven at about 145° C. The oriented foam was found to have a tensile strength at break of approximately 5.0 kpsi at 27% elongation in the MD and a tensile strength at break of approximately 2.1 kpsi at 12% elongation in the CD. The oriented foam had a density of 0.46 g/cc.

Example 6

A foam was prepared from high melt strength polypropylene (Montell PF814™) using 3% by weight FM1307H chemical blowing agent in a 25 mm Berstorff twin screw extruder operated at 82 rpm. The temperature profile in the extruder was from 160 to 235 to 180° C. (175° C. exit temperature), creating an exit pressure of 13.8 MPa. The melt mixed polymer was extruded through a 15 cm foam die and the extrudate was nipped between two chrome cast rolls, each at 77° C., at 276 kPa, then collected at a draw rate of 3 m/min. The resulting foam, shown in FIG. 8, had a density of 0.56 g/cc and a thickness of 0.7 mm, with cells that were uniform in size (30–50 μm) and significantly elongated in the MD.

The foam was subjected to orientation of three types: sequential biaxial, simultaneous biaxial, and uniaxial. Properties of the foams resulting from equal simultaneous biaxial and uniaxial draw are shown in Table 1. In the Table, draw ratios are reported as Total Draw (TD), calculated as the product of (MD×CD).

TABLE 1

| Sample | Simultaneous Biaxial TD | density, g/cc | Sample | Uniaxial TD | density, g/cc |
|---|---|---|---|---|---|
| 6-1 | 1 | 0.56 | 6-1 | 1 | 0.56 |
| 6-2 | 4 | 0.38 | 6-7 | 3.5 | 0.49 |
| 6-3 | 6.25 | 0.36 | 6-8 | 4 | 0.48 |
| 6-4 | 9 | 0.31 | 6-9 | 5 | 0.43 |
| 6-5 | 12.25 | 0.27 | 6-10 | 6 | 0.38 |
| 6-6 | 20.25 | 0.25 | | | |

The data show that foams of the present invention exhibit the unusual property of decreased density with increased draw or orientation. Foams can withstand larger total draw when simultaneous biaxially drawn, and, therefore, greater density reduction on drawing. Note for Sample 6-4 even though the density is significantly lower than that of the 2.5× by 2.5× sample of Comparative Example 2, the mechanical properties are improved. The densities of foam samples 6-11 and 6-12 were 0.24 and 0.22 g/cc, respectively.

Properties of the oriented foams are shown in Table 2.

TABLE 2

| Sample | Orientation | MD tensile stress, kpsi | MD tensile strain, % elongation | CD tensile stress, kpsi | CD tensile strain, % elongation |
|---|---|---|---|---|---|
| 6-4 | Sim 3 × 3 | 5.0 | 42 | 4.8 | 30 |
| 6-9 | Uni 5 × 1 | 11 | 26 | 1.4 | 10 |
| 6-11 | Seq 3 × 3.5 | 6.5 | 37 | 4.7 | 24 |
| 6-12 | Sim 4 × 4 | 6.4 | 33 | 6.0 | 28 |

Sim = simultaneous biaxial orientation
Uni = uniaxial orientation
Seq = sequential biaxial orientation: MD followed by CD The data of Table 2 show that tensile strength increases slightly as degree of orientation increases. Simultaneous biaxial orientation provides a more isotropic foam than does sequential biaxial orientation. Uniaxially oriented foams are quite strong in the machine direction and are noticeably weaker in the cross direction.

Example 7

Foams were prepared as described in Example 6, except that 6% by weight of FM1307H blowing agent was used, producing foams having a lower density, 0.43 g/cc, and greater thickness, 0.9 mm. The foam was subjected to either simultaneous biaxial orientation or uniaxial orientation. Results are shown in Table 3.

TABLE 3

| Sample | Simultaneous Biaxial TD | density, g/cc | Sample | Uniaxial TD | density, g/cc |
|---|---|---|---|---|---|
| 7-1 | 1 | 0.43 | 7-1 | 1 | 0.43 |
| 7-2 | 4 | 0.27 | 7-8 | 3 | 0.29 |
| 7-3 | 6.25 | 0.25 | 7-9 | 3.8 | 0.29 |
| 7-4 | 9 | 0.19 | 7-10 | 4.5 | 0.32 |
| 7-5 | 12.25 | 0.17 | 7-11 | 5.5 | 0.34 |
| 7-6 | 16 | 0.17 | | | |
| 7-7 | 20.25 | 0.16 | | | |

The data of Table 3 show that, while foam density reaches an apparent minimum due to uniaxial orientation, no minimum was reached due to biaxial orientation. Foams that have densities of less than 0.2 g/cc resulting from the use of chemical blowing agents (activated during extrusion) are very rare, but were easily achieved by the method of the invention.

Tensile properties for two foams prepared by the method of this example were obtained, shown in Table 4. The density of foam sample 7-12 was 0.37 g/cc.

TABLE 4

| Sample | Orientation | MD tensile stress, kpsi | MD tensile strain, % elongation | CD tensile stress, kpsi | CD tensile strain, % elongation |
|---|---|---|---|---|---|
| 7-4 | Sim 3 × 3 | 3.5 | 25 | 2.8 | 20 |
| 7-12 | Uni 4 × 1 | 4.5 | 26 | 0.9 | 10 |

Sim = simultaneous biaxial orientation
Uni = uniaxial orientation

The data of Table 4 show that, in comparison to the data of Table 2, foams with an initial lower density showed generally lower tensile stress properties.

Example 8

A melt mixture consisting of 67% by weight of high melt strength polypropylene (Montell PF814™), 30% by weight of a metallocene-polymerized semicrystalline polyethylene/polyoctene copolymer (Engage™ 8200, DuPont Dow Elastomers LLC, Wilmington, Del.), and 3% by weight chemical blowing agent (FM1307H) was prepared in a 25 mm Berstorrf twin screw extruder operated at 82 rpm with a temperature profile from 160 to 235 to 162° C. (174° C. exit temperature). The resulting foam was 0.75 mm thick and had a density of 0.56 g/cc, and was observed to be much softer and more pliable than previous unblended foams as described, for example, in Example 6.

Orientation of the foamed, blended materials gave films having properties shown in Table 5. The density of foam sample 8-2 was 0.41 g/cc.

TABLE 5

| Sample | Orientation | MD tensile stress, kpsi | MD tensile strain, % elongation | CD tensile stress, kpsi | CD tensile strain, % elongation |
|---|---|---|---|---|---|
| 8-1 | Sim 3.5 × 3.5 | 4.0 | 32 | 2.8 | 18 |
| 8-2 | Uni 5 × 1 | 6.7 | 25 | 0.77 | 23 |

Sim = simultaneous biaxial orientation
Uni = uniaxial orientation

The data of Table 5 can be compared to that of Table 2 to show that foams prepared from polymer blends show significantly lower tensile properties than those from homogeneous compositions.

Example 9

Figure 9:
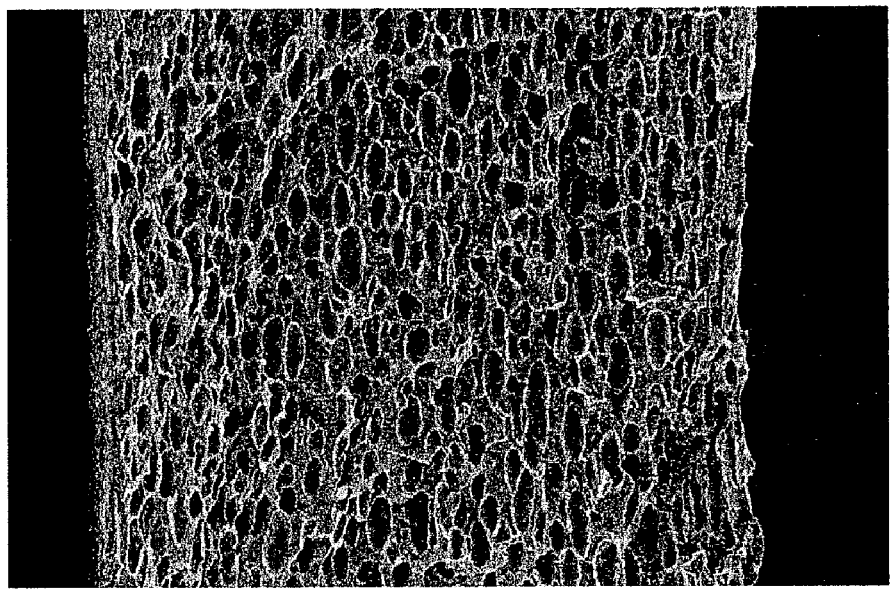
FIG. 9 is a digital image of a SEM of a side elevation of the unoriented foam of Example 9.

A melt mixture identical in composition to that described in Example 8 was prepared in a Davis-Standard 2.5" (6.3 cm) single screw extruder operated at 40 rpm with a temperature profile of from 127 to 216 to 204° C. (175° C. exit temperature) creating an exit pressure of 13.8 MPa. Extrusion through a 25.4 cm foam die onto a chrome cast roll chilled to 49° C. (collection draw rate of 3 m/min) produced a foam of 0.66 g/cc density and 1.1 mm thickness. FIG. 9 represents an electron micrograph of the unoriented foam, showing uniform cells of approximately 30–50 μm in size that are slightly elongated in the MD.

Figure 10:
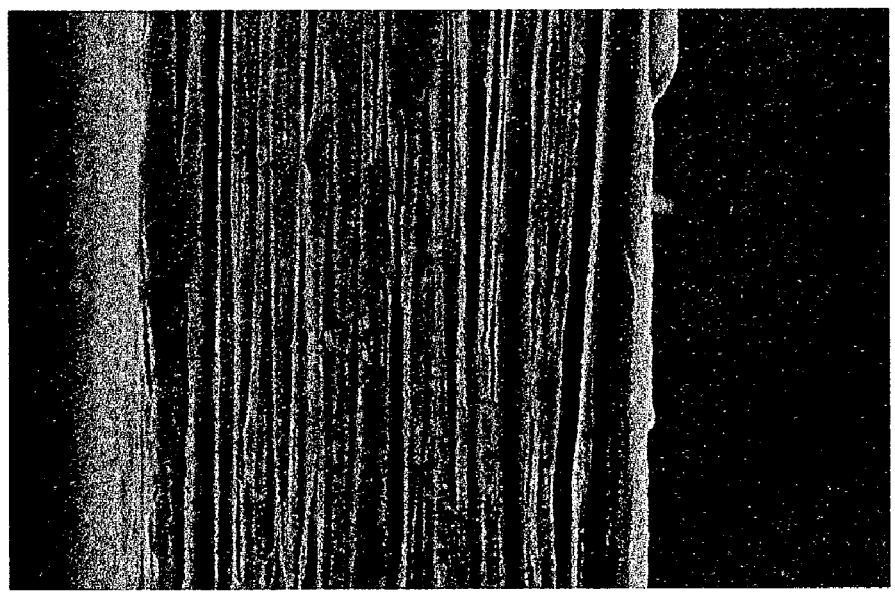
FIG. 10 is a digital image of a SEM of a side elevation of the oriented foam of Example 9.

The foam was oriented continuously as described in Example 5 at a rate of 3× in the MD followed by 2.3× in the CD. FIG. 10 represents a micrograph of the oriented foam, showing elongated cells in the MD (bottom to top) after orientation. The oriented foam had density of 0.56 g/cc and a thickness of 0.1 mm. Properties of the foam are presented in Table 6.

TABLE 6

| Sample | Orientation | MD tensile stress, kpsi | MD tensile strain, % elongation | CD tensile stress, kpsi | CD tensile strain, % elongation |
|---|---|---|---|---|---|
| 9-1 | Seq 3 × 2.3 | 4.8 | 24 | 2.5 | 21 |

Seq = sequential biaxial orientation: MD followed by CD

The data of Table 6 can be compared to those presented in Example 5 to show that a foam of this particular blend has tensile properties essentially identical to those of pure polypropylene because the density of the oriented foam in this Example is higher than that of the oriented foam of Example 5 (0.56 to 0.47 g/cc).

Example 10

Figure 11:
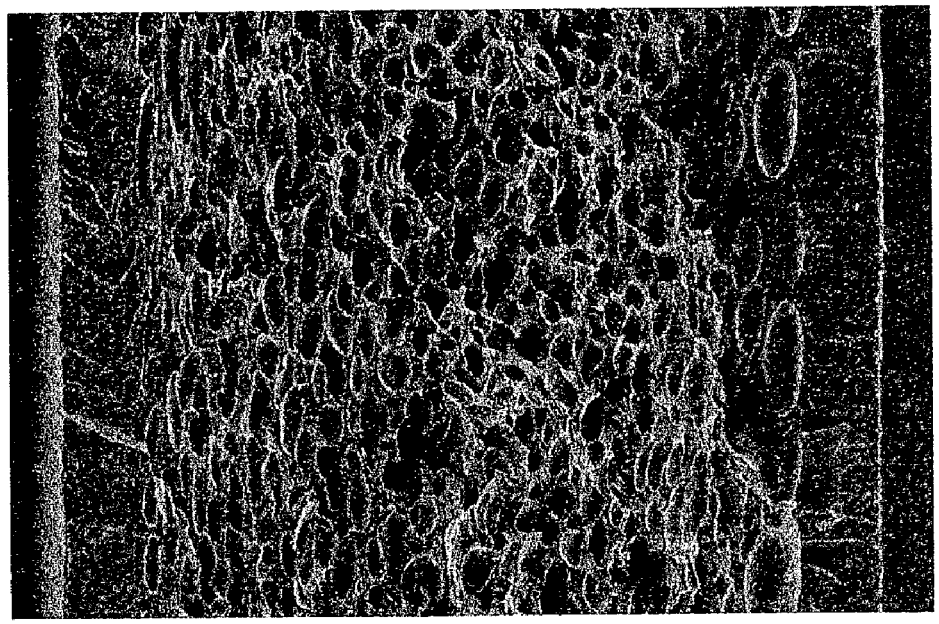
FIG. 11 is a digital image of a SEM of a side elevation of the unoriented foam of Example 10.

A foam material was prepared having non-foam, coextruded polymeric skins on each surface of the foam. A melt mixture of 48.9% by weight high melt strength polypropylene (Montell PF814™), 48.9% by weight isotactic polypropylene (Fina PP3374™) and 2.2% by weight chemical blowing agent (FM1307H) was prepared in a Killion single screw extruder operated at 80 rpm with a temperature profile of from 171 to 221 to 185° C. (exit temperature 204° C.) to create an exit pressure of 18.6 MPa. A single-component skin of isotactic polypropylene (Fina PP3374™) was coextruded on each face of the foam melt mixture by means of a Killion single screw extruder operated at 171 rpm and 243° C. The foam melt mixture was extruded through a 15 cm foam die, chilled on a chrome cast roll at 46° C. and collected at a drawing rate of 0.6 m/min to provide a foam construction having a thickness of 2.13 mm and a density of 0.53 g/cc. A micrograph of the foam is shown in FIG. 11, in which cells of approximately 50–100 μm size are seen.

Figure 12:
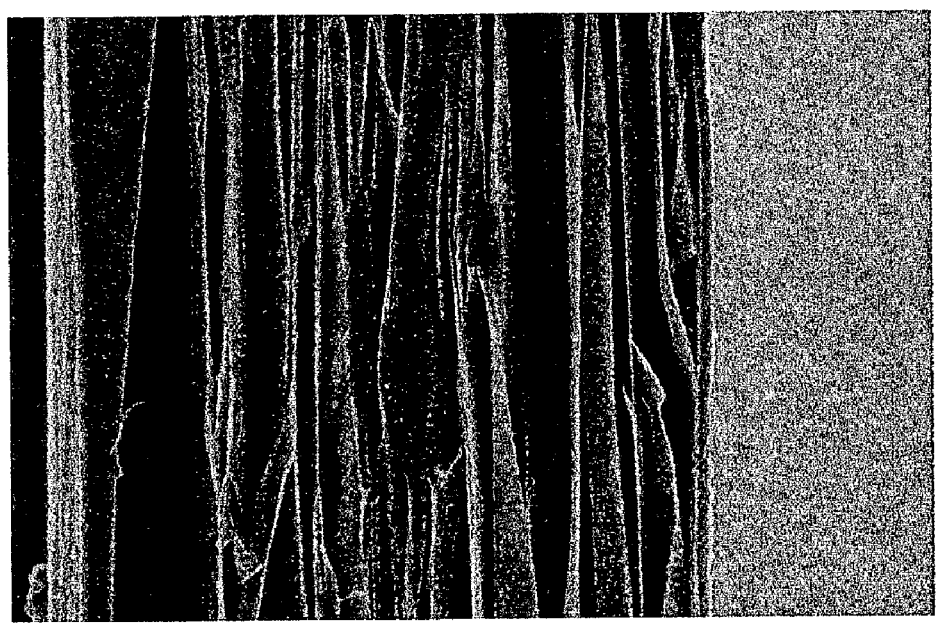
FIG. 12 is a digital image of a SEM of a side elevation of the oriented foam of Example 10.

Sequential 5×5 biaxial orientation (multi-roll LO followed by tenter) of the foam construction provided the foam shown in FIG. 12, having a density of 0.45 g/cc and a thickness of 0.28 mm. Sequential 5×5 biaxial orientation provided a foam having the properties shown in Table 7.

TABLE 7

| Sample | Orientation | MD tensile stress, kpsi | MD tensile strain, % elongation | CD tensile stress, kpsi | CD tensile strain, % elongation |
|---|---|---|---|---|---|
| 10-1 | Seq 4 × 3 | 7.0 | 22 | 4.0 | 15 |

Seq = sequential biaxial orientation: MD followed by CD

The coextruded, oriented foams of this Example can be compared to the non-coextruded foam of Example 5, showing that the coextruded foams were stronger, i.e., had a higher tensile stress at break, even though the coextruded foams had larger cell sizes.

Example 11

A foam material was prepared having non-foam, coextruded polymeric skins on each surface of the foam. A melt mixture of 98% by weight high melt strength polypropylene (Montell PF814™) and 2.2% by weight chemical blowing agent (FM1307H) was prepared in a 65 mm Berstorff twin screw extruder operated at 84 rpm with a temperature profile of from 180 to 230 to 150° C. (exit temperature 167° C.) to create an exit pressure of 116 bar. A single-component skin of isotactic polypropylene (Fina PP3571™) was coextruded on each face of the foam melt mixture by means of two Davis Standard 2.5" and 2" single screw extruders operated at 41 and 75 rpm, respectively, and 240° C. The foam melt mixture was extruded through a 14" three-layer Cloeren die, chilled on a chrome cast roll at 20.1° C. and collected at a drawing rate of 3.1 m/min to provide a foam contruction having a thickness of 2.6 mm and a density of 0.63 g/cc. A micrograph of the foam is similar to that of FIG. 11 except the cell sizes range from 30–50 μm.

Simultaneous 5.4×6 biaxial orientation (Berstorff LISIM tenter) of the foam construction provided a foam having a density of 0.5 g/cc and a thickness of 0.13 mm with the properties shown in Table 8.

TABLE 8

| Sample | Orientation | MD tensile stress, MPa | MD tensile strain, % elongation | CD tensile stress, MPa | CD tensile strain, % elongation |
|---|---|---|---|---|---|
| 11-1 | Simo 5.4 × 6 | 74 N/mm$^2$ | 57 | 68 N/mm$^2$ | 43 |

The coextruded, oriented foams of this Example can be compared to the coextruded foam of Example 10, showing that the simultaneous biaxially oriented foams have a more balanced set of properties in the two directions. In addition, the simultaneously oriented samples exhibited considerably lower shrinkage.

The invention claimed is:

1. A multilayer article comprising at least one oriented high melt strength polypropylene foam layer wherein the foam has an average cell size of 50 micrometers or less prior to orientation, wherein the high melt strength polypropylene has a melt strength in the range of 25 to 60 cN at 190° C.

2. The multilayer article of claim 1 further comprising at least one thermoplastic film layer.

3. The multilayer article of claim 2 wherein said film layer comprises polypropylene.

4. The multilayer article of claim 1 further comprising an adhesive layer.

5. The multilayer article of claim 1 wherein the oriented high melt strength polypropylene foam is less than the density of the foam prior to orientation.

6. The multilayer article of claim 1 wherein the oriented high melt strength polypropylene foam was oriented at or above the alpha transition temperature and below the melt temperature of the polypropylene.

7. The multilayer article of claim 1 wherein the oriented high melt strength polypropylene foam is uniaxially oriented.

8. The multilayer article of claim 7 wherein the orientation is at least 3 X.

9. The multilayer article of claim 1 wherein the oriented high melt strength polypropylene foam is biaxially oriented.

10. The multilayer article of claim 9 wherein the biaxially oriented foam was simultaneously biaxially oriented.

11. The multilayer article of claim 9 wherein the orientation is 3 to 50 draw ratio.

12. The multilayer article of claim 1 wherein the oriented high melt strength polypropylene comprises homo- and copolymers containing 50 weight percent or more propylene monomer units, and wherein the polypropylene has a melt strength in the range of 25 to 60 cN at 190° C.

13. The multilayer article of claim 12 wherein the copolymers are selected from random, block, and grafted copolymers of propylene and an α-olefin selected from the group consisting of $C_3$–$C_8$ α-olefins and $C_4$–$C_{10}$ dienes.

14. The multilayer article of claim 1 wherein the oriented high melt strength polypropylene foam further comprises a minor amount of a semicrystalline or amorphous polymer.

15. An oriented high melt strength polypropylene foam having an average cell size prior to orientation of 50 micrometers or less wherein the tensile strength of the foam in the cross direction is within 30% of the tensile strength in the machine direction.

16. A multilayer article comprising the foam of claim 15.

17. The multilayer article of claim 16 further comprising an adhesive layer.

* * * * *